S. K. DENNIS.
CORN PLANTER.
APPLICATION FILED APR. 13, 1911.

1,001,367.

Patented Aug. 22, 1911.

Witnesses:
C. C. Palmer.
F. W. Hoffmeister.

Inventor.
Samuel K. Dennis.
By E. W. Burgess
Attorney

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

CORN-PLANTER.

1,001,367.   Specification of Letters Patent.   Patented Aug. 22, 1911.

Application filed April 13, 1911. Serial No. 620,732.

*To all whom it may concern:*

Be it known that I, SAMUEL K. DENNIS, a citizen of the United States, residing at Chicago, in the county of Cook and State of Illinois, have invented certain new and useful Improvements in Corn-Planters, of which the following is a specification.

My invention relates to corn planters, and in particular to the means for holding the bottom of the seed hopper in place when it is desired to turn the hopper about its hinge connection with its support for the purpose of changing the seed plates or removing the seed from the hopper, and consists in an automatically operative locking mechanism that prevents the removal of the bottom until the hopper has been turned about its hinge connection to a predetermined angle with its support; the object of my invention being to provide a mechanism simple and strong in construction and efficient in operation. I attain these objects by means of the mechanism illustrated by the accompanying drawing, in which—

Figures 1, 2:
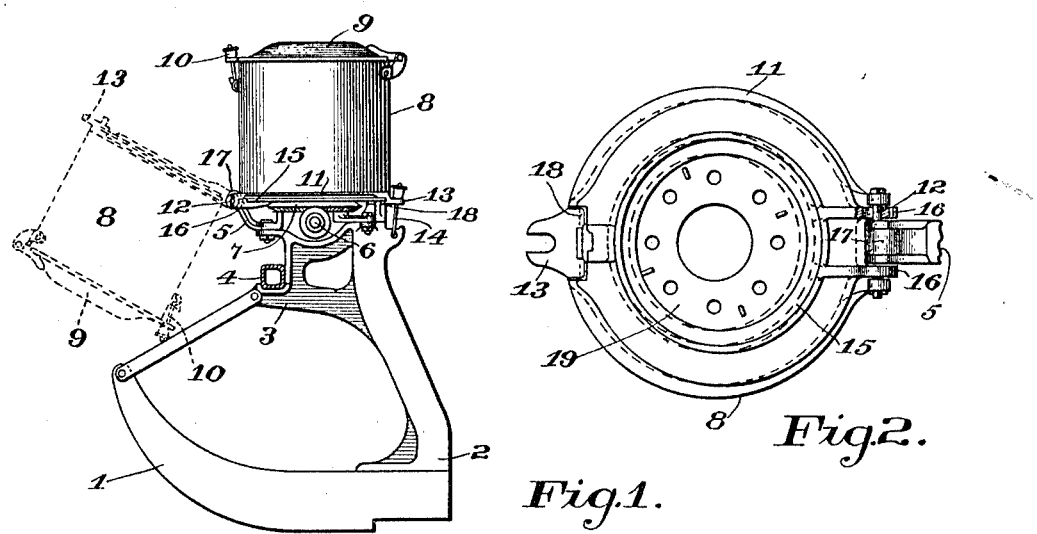
Figures 3, 4:
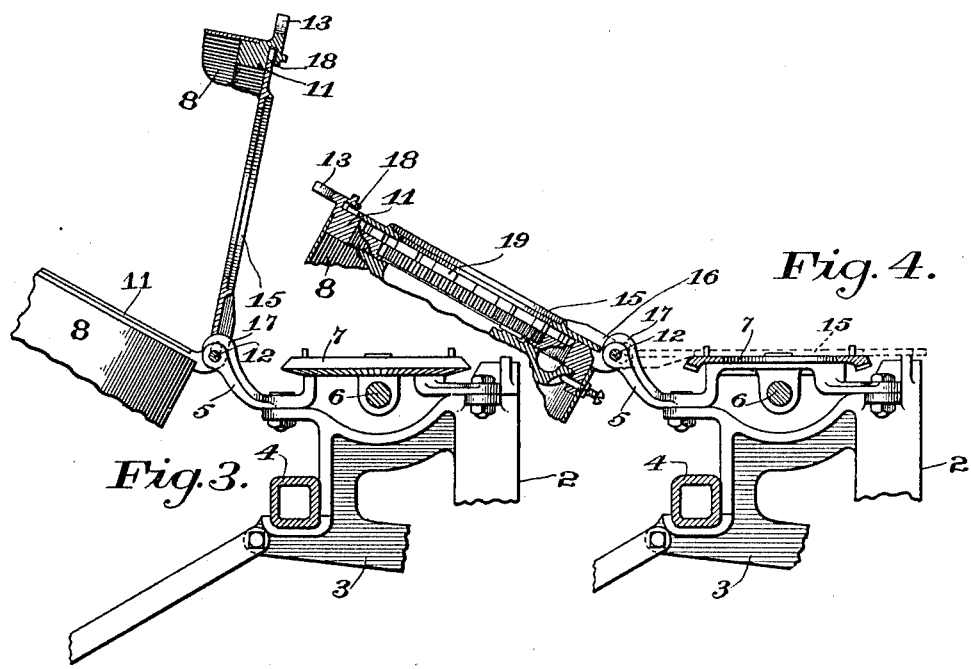

Figure 1 represents a side elevation of part of a corn planter having my invention embodied in its construction; Fig. 2 is a view of the bottom of the hopper on an enlarged scale; Fig. 3 is a side elevation of part of Fig. 1, representing the hopper in various positions of its swinging movement about the axis of its hinge connection with its support; and Fig. 4 is a similar view, partly in section, designed to illustrate the operation of the associated mechanism.

Like reference characters designate the same parts throughout the several views.

1 represents a furrow opener of a corn planter having its rear end secured to the lower end of a seed conduit 2, the upper end of the conduit being provided with a forwardly projecting bracket portion 3 to which is secured a bar 4 forming part of the draft frame of the machine.

5 represents a seed hopper supporting base secured to the upper side of the bracket portion and having a seed shaft 6 journaled therein that is adapted to transmit rotary movement to a gear wheel 7 supported upon the hopper supporting base.

8 represents a seed hopper including a hinged lid 9 having a common form of locking mechanism 10, and 11 represents an annular ring that is connected with the hopper supporting base 5 by means of a hinge pin 12 and adapted to receive the lower end of the seed hopper in a releasable manner, and 13 represents an outwardly projecting slotted ear portion opposite the hinge pin that is adapted to receive a swinging locking member 14 pivotally connected with the supporting base member and adapted to secure the hopper and base member in operative relation in a well-known manner.

15 represents an annular plate provided with ear members 16 that have slotted openings therein that receive the hinge pin 12 in a manner permitting the plate to have a sliding movement relative to the annular ring 11 as the hopper is turned about its hinge connection.

17 represents a flange upon the hinge member of the hopper supporting base that is arranged eccentric to the axis of the hinge connection and adapted to contact with the edge of plate 15 in a manner to cause it to slide upon the ring 11 when the hopper is turned to a closing position. As the ring slides away from the hinge pin its opposite edge passes between an inwardly projecting lip portion 18 integral with the ear portion 13 and the bottom of the ring 11 in a manner to lock the parts together, and when the hopper is turned to the position shown by dotted lines in Fig. 1 the plate may slide away from the holding lip in a manner permitting it to swing independently of the ring 11 and allow the removal of the seed plate 19 and other operative parts of the seed delivering mechanism.

What I claim as my invention, and desire to secure by Letters Patent, is:

1. A corn planter including, in combination, a seed conduit, a seed hopper including a bottom plate, a hopper supporting base connected with said seed conduit, said hopper being connected with said base by means of a hinge joint, said bottom plate being hingedly connected with said base coaxially with said hopper and adapted to slide toward or from the axis of said hinge connection.

2. A corn planter including, in combination, a seed conduit, a seed hopper including a bottom plate, a hopper supporting base connected with said seed conduit, said hopper being connected with said base by means of a hinge joint, said bottom plate being hingedly connected with said base coaxially with said hopper, and means operative to slide said plate away from the axis of said hinge connection toward the opposite side of said hopper when said hopper is turned about its hinge connection in one direction.

3. A corn planter including, in combination, a seed conduit, a seed hopper including a bottom plate, a hopper supporting base connected with said seed conduit, said hopper being connected with said base by means of a hinge joint, said bottom plate being hingedly connected with said base coaxially with said hopper, and a flange forming part of said hopper supporting base, said flange being arranged eccentric to the axis of said hinge connection and operative to slide said plate away from the axis thereof and toward the opposite side of said hopper when said hopper is turned about its hinge connection in one direction.

4. A corn planter including, in combination, a seed conduit, a seed hopper including a bottom plate, a hopper supporting base connected with said seed conduit, said hopper being connected with said base by means of a hinge joint, said bottom plate being hingedly connected with said base coaxially with said hopper, a flange forming part of said hopper supporting base, said flange being arranged eccentric to the axis of said hinge connection and operative to slide said plate away from the axis thereof and toward the opposite side of said hopper when said hopper is turned about its hinge connection in one direction, and a lip portion forming part of said hopper and adapted to engage with said plate in a manner to hold it in contact with said hopper when said hopper is being turned in a reverse direction.

SAMUEL K. DENNIS.

Witnesses:
    JAMES A. MOXEY,
    EVAN EVANS.

---

Copies of this patent may be obtained for five cents each, by addressing the "Commissioner of Patents Washington, D. C."